US009158451B2

(12) United States Patent
Lee (10) Patent No.: US 9,158,451 B2
(45) Date of Patent: Oct. 13, 2015

(54) TERMINAL HAVING TOUCH SCREEN AND METHOD FOR DISPLAYING DATA THEREOF (71) Applicant: Samsung Electronics Co., Ltd., Gyeonggi-do (KR)

(72) Inventor: Jaemyoung Lee, Seoul (KR)

(73) Assignee: Samsung Electronics Co., Ltd., Yeongtong-gu, Suwon-si, Gyeonngi-do (KR)

( * ) Notice: Subject to any disclaimer, the term of this patent is extended or adjusted under 35 U.S.C. 154(b) by 125 days.

(21) Appl. No.: 13/666,091

(22) Filed: Nov. 1, 2012

(65) Prior Publication Data

US 2013/0106753 A1    May 2, 2013

(30) Foreign Application Priority Data

Nov. 2, 2011 (KR) ........................ 10-2011-0113213

(51) Int. Cl.
*G06F 3/041* (2006.01)
*G06F 3/0488* (2013.01)
*H04M 1/725* (2006.01)

(52) U.S. Cl.
CPC .... *G06F 3/0488* (2013.01); *G06F 2203/04803* (2013.01); *H04M 1/72519* (2013.01); *H04M 2250/22* (2013.01)

(58) Field of Classification Search
CPC ..... H04L 29/1249; H04L 43/10; H04L 67/10; H04L 67/104; H04L 67/289; H04L 29/06027; H04L 63/08; H04L 63/0853; H04L 63/126; H04L 65/103; H04L 65/104; H04L 65/4092; G06F 3/0485; G06F 2203/04101; G06F 2203/04806; G06F 3/016; G06F 1/1626; G06F 3/04815; G06F 3/04817; G06F 3/04847; G06F 1/1643; G06F 1/1652; G06F 1/1684; G06F 2203/04104; G06F 3/0414; G06F 3/0483; G06F 17/24; G06F 17/3086; G06F 3/0481; G06F 9/4443; G06F 17/30274; G06F 19/321; G06F 1/1694; G06F 2203/04802; G06F 3/033; G06F 3/0482; G06F 3/0488; H04M 2250/22; H04M 1/72527; H04M 1/72552; H04M 2250/12; H04M 1/0266; H04M 1/0268; H04M 1/05; H04M 1/67; H04M 1/72519
USPC ......................................... 345/169, 173–175
See application file for complete search history.

(56) References Cited

U.S. PATENT DOCUMENTS

| | | | |
|---|---|---|---|
| 5,899,979 A * | 5/1999 | Miller et al. .................. 705/7.21 |
| 2004/0109025 A1* | 6/2004 | Hullot et al. .................. 345/764 |
| 2008/0178110 A1* | 7/2008 | Hill et al. ...................... 715/771 |
| 2009/0172532 A1* | 7/2009 | Chaudhri ...................... 715/702 |
| 2009/0174680 A1* | 7/2009 | Anzures et al. ............... 345/173 |
| 2010/0099462 A1* | 4/2010 | Baek et al. .................... 455/566 |
| 2010/0223575 A1* | 9/2010 | Leukart et al. ................ 715/779 |
| 2011/0187709 A1* | 8/2011 | Lee et al. ...................... 345/419 |

* cited by examiner

*Primary Examiner* — Duc Dinh
(74) *Attorney, Agent, or Firm* — Cha & Reiter, LLC.

(57) ABSTRACT

A method for displaying data in a terminal having a touch screen, the method comprises: displaying data in a data display area and determining whether a touch event is sensed in a data display mode; checking an area where the touch event is sensed, and checking whether the touch event was moving if the touch event is sensed; checking a direction of motion of the touch event if the touch event was moving; rotating the data display area according to the direction of motion of the touch event; and displaying data of the order according to the rotating direction in an area where the rotated data is being displayed.

18 Claims, 6 Drawing Sheets

TERMINAL HAVING TOUCH SCREEN AND METHOD FOR DISPLAYING DATA THEREOF

CLAIM OF PRIORITY

This application claims the benefit under 35 U.S.C. §119(a) of a Korean patent application filed on Nov. 2, 2011 in the Korean Intellectual Property Office and assigned Serial No. 10-2011-0113213, the entire disclosure of which is hereby incorporated by reference.

BACKGROUND OF THE INVENTION

1. Field of the Invention

The present invention relates to a terminal having a touch screen and a method for displaying data therein, and more particularly, to a method for visually displaying data according to a touch event sensed through the touch screen and a terminal for performing the same.

2. Description of the Related Art

With the development of a modern information technology, the capabilities of terminals for performing various functions have advanced, and many users use such terminals. Examples of such terminals include a computer, a notebook computer, a smart phone, and a tablet PC. Further, with the development of touch screen technology, the demand for terminals with a touch screen is on the increase. A terminal having a touch screen can perform both the functions of an input unit and a display unit at the same time. Also, a terminal having a touch screen can directly change data generated according to a sensed touch screen and display the changed data. As such, many users prefer terminals having a touch screen. In a terminal having a touch screen, it is possible to display data changed according to a sensed touch event, but the process of changing the data is not visually displayed. That is, data that has been changed according to a touch event is arranged in a one-dimensional form, but this is not visually appealing to a user. As such, there is a need for a study and design of a method for variously displaying data according to a touch event.

SUMMARY OF THE INVENTION

Therefore, the present invention provides a terminal having a touch screen and a method for displaying data according to a touch event in the terminal.

In accordance with one aspect of the present invention, a method for displaying data in a terminal having a touch screen includes: rotating at least a portion of a display area of the touch screen in a direction according to a direction of motion of a touch event sensed by the touch screen, wherein the said portion of the display area comprises at least one of a main display area and a stack display area, the display area being displaying data in a data display mode.

In accordance with another aspect of the present invention, a terminal for displaying data includes: a touch screen comprising a display unit that displays data in a data display area and a touch sensor that senses a touch event; and a controller that determines, if a touch event is sensed through the touch screen, an area in the data display area in which a touch event is sensed, determines whether the touch event is a movement, and then, if the touch event is determined to be a movement, controls the display unit to rotate the data display area in a direction according to a direction of motion of the touch event and displays data in a sequence according to the direction of rotation of the rotated data display area.

In accordance with another aspect of the present invention, a method for displaying data in a terminal having a touch screen includes: displaying, in a schedule management mode, month data in a main display area, and displaying 'things-to-do' data which is added to the month data according to a user's setting in a stack display area; determining whether a touch event that is sensed in the main display area moves; and, if the touch event is determined to be a movement, determining a direction of motion of the sensed touch event; changing month data displayed in the main display area, displaying a next or previous month data in a pre-defined sequence order according to the direction of motion of the touch event, and rotating the stack display area; and displaying the 'things-to-do' data in the rotated stack display area according to the direction of rotating of the stack display area.

BRIEF DESCRIPTION OF THE DRAWINGS

The above features and advantages of the present invention will be more apparent from the following detailed description in conjunction with the accompanying drawings, in which.

DETAILED DESCRIPTION OF EXEMPLARY EMBODIMENTS

Exemplary embodiments of the present invention are described with reference to the accompanying drawings in detail. The same reference numbers are used throughout the drawings to refer to the same or like parts. For the purposes of clarity and simplicity, detailed descriptions of well-known functions and structures incorporated herein may be omitted to avoid obscuring the subject matter of the present invention.

A terminal refers to an information processing device which is connected to an external terminal by wire or wirelessly and receives and transmits various data. Here, the terminal has a touch screen, and can be part of a well known device such as a computer, a notebook computer, a tablet PC and a smart phone, etc.

A touch event refers to an action where the user's finger or an input tool under the control of the user momentarily contacts the surface of a touch screen in a terminal and release action of the surface. However, a movement of a touch event means that the contact is maintained for a period of time and the tool (or finger) is dragged in a certain direction by the user before the touch is released; this moving touch event is sensed through a touch screen.

The term "data in a sequence order" can be data, a specific arrangement of identified data, or a group of data having a plurality of versions (or members) where each version is related, as per a defined order, with any other version. For example, the months of a year is ordered data wherein each month is related to any other month based on a specific order of months. Also, each version may have a previous order and a next order respectively representing a forward or backward progression from one version to the next immediate version forward or backward as per the defined order. Specifically, for example, the month of March has a previous order of data of the month of February and a next order of data of the month of April.

Figure 1:
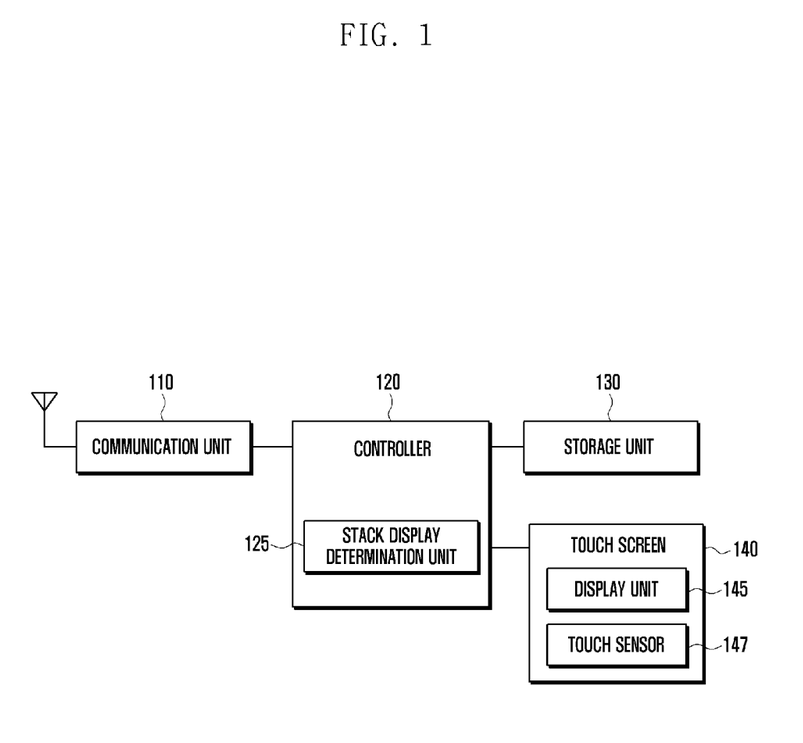
FIG. 1 illustrates a constitution of a terminal according to an exemplary embodiment of the present invention.

FIG. 1 illustrates a constitution of a terminal according to an exemplary embodiment of the present invention.

Referring to FIG. 1, a terminal comprises a communication unit 110, a controller 120, a storage unit 130, and a touch screen 140.

The communication unit 110 performs a communication function between a terminal and a base station. The communication unit 110 may include a duplexer for separating a transmitting function and a receiving function, a transmission unit for up-converting the frequency of a signal, to be transmitted and a receiving unit for down-converting the frequency of a received signal. Further, the communication unit 110 can be connected to a network and transmit and receive data under the control of the controller 120.

The controller 120 controls the state and operations of all components constituting the terminal. As shown in FIG. 1, the controller 120 can control the display unit 145 to rotate an area where data is being displayed according to the direction of motion of a touch event sensed through the touch screen 140 in data display mode. Further, the controller 120 can control the display unit 145 to display data of the previous order or data of the next order (collectively "data in a sequence order") according to the rotation direction in the rotated data display area. Here, a data display mode represents a mode for displaying some or all data stored in the storage unit 130, such as a schedule management mode, a memo mode, an image display mode, a message display mode, and an e-mail display mode.

The controller 120 can divide the display unit 145 into at least two display areas. For example, the controller controls the display unit 145 to be divided into a main display area for displaying main data and a stack display area for displaying additional data added to the main data. Further, the controller 120 can control the display unit 145 to display main data and additional data in each of the divided display areas. The main data means data mainly displayed in the display unit 145 at data display mode. Additional data is data added to the main data.

Further, the additional data can be displayed in the display unit 145 when main data is selected, or can be displayed as lower level data of the main data or data dependent on the main data in case the additional data is displayed along with the main data. Although it has been explained above that the controller 120 displays corresponding data respectively in the display unit divided into at least two display areas, the present invention is not limited to this example. That is, the controller 120 can control the display unit 145 to arrange data in the form of a list, or display data in the form of an icon or thumbnail corresponding to each set of data.

The controller 120 determines whether a touch event is sensed through the touch screen 140. If a touch event is sensed, the controller 120 checks an area where a touch is sensed. Further, the controller 120 determines whether a touch event sensed through the touch screen 140 had moved. If the touch event had moved, the controller 120 determines the direction of motion of the touch event and rotates an area where data is displayed. To this end, the controller 120 further includes a stack display determination unit 125.

The stack display determination unit 125 checks the direction of motion of a touch event, and controls the display unit 145 to rotate an area where data is displayed according to the direction of motion. Further, the stack display determination unit 125 displays data of a previous order or data of a next order according to a moving direction or rotating direction in an area where rotated data is displayed. Data of the previous order can be displayed in case a touch event moves from the upper side to the lower side of the display unit 145 or from left to right. Further, data of the next order can be displayed in case the touch event moves from the lower side to the upper side of the display unit 145 or from right to left. Here, the data in a sequence order displayed according to the direction of motion of the touch event can vary depending on the manufacturing company of terminals or the user's setting.

For example, if a touch event moves from the lower area to the upper area of the display unit 145, the stack display determination unit 125 rotates the data display area of the display unit 145 from the lower side to the upper side of the display unit in a direction of motion of the touch event. Further, if a touch event moves from the left area to the right area of the display unit 145, the stack display determination unit 125 rotates the data display area in a direction of motion of a touch event. Further, if a touch event moves in an upward diagonal direction, the stack display determination unit 125 rotates the data display area in an upward diagonal direction.

The stack display determination unit 125 controls the display unit 145 to change data in a sequence order according to a rotational direction of a data display area and display the changed data. For example, if the data display area has rotated from the left side to the right side of the display unit 145, the stack display determination unit 125 newly displays data of the previous order in the data display area. Further, when the data display area has rotated from right to left, the stack display determination unit 125 newly displays data of the next order in the data display area.

Although it has been described above that the entire data display area of the display unit 145 is rotated according to the direction of motion of a touch event sensed through the touch screen 140, the present invention is not limited to this example. That is, the stack display determination unit 125 can divide a display area into specific display areas, and rotate each specific display area according to the direction of motion of the touch event. At this time, the stack display determination unit 125 can move data in a sequence order according to the rotating direction for each rotated specific display area.

Further, the stack display determination unit 125 can control the rotating speed of the area where data is displayed according to the speed of motion of a sensed touch event. That is, if the speed of motion of the touch event is relatively fast, the stack display determination unit 125 can accordingly quickly rotate the display area. Further, if the speed of motion of the touch event is relatively slow, the stack display determination unit 125 can accordingly slowly rotate the display area.

Up to now, the discussion above describes a case where the data display area is not divided into a main display area and a stack display area has been explained. Hereinafter, a case where data is displayed separately in a main display area and a stack display area will be explained.

If a touch event is sensed through a touch screen 140, the stack display determination unit 125 checks an area where a touch event is sensed. Further, the stack display determination unit 125 determines whether an area in which a touch event is sensed is located in a main display area. The method of determining whether an area in which a touch event is sensed is located in a main display area is explained below. The stack display determination unit 125 checks the location coordinates of an area where a touch event is sensed. Further, the stack display determination unit 125 determines whether the checked coordinates are the coordinates allocated to the main display area.

If the area in which a touch event is sensed is located in the main display area, the stack display determination unit 125 determines whether the touch event is a movement. If the touch event is determined to be a movement, the stack display determination unit 125 changes data displayed in the main display area according to the direction of motion of the touch event, and displays the data in a sequence order. Further, the stack display determination unit 125 rotates at least one area in which data is displayed according to the direction of motion of the sensed touch event.

For example, if the touch event moves from the lower area to the upper area of the display unit 145, the stack display determination unit 125 moves the main display area in an upward direction that is the same as the direction of motion of the touch event. Further, the stack display determination unit 125 rotates the stack display area in an upward direction that is the same as the direction of motion of the touch event. Further, if the touch event moves from the left area to the right area of the display unit 145, the stack display determination unit 125 moves the main display area in a left to right direction that is the same as the direction of motion of the touch event. Further, the stack display determination unit 125 rotates the stack display area in a left to right direction that is the same as the direction of motion of the touch event. At this time, the stack display determination unit 125 can divide areas where each of additional data displayed in the stack display area is arranged into specific areas for each set of data, and rotate each specific area according to the direction of motion of the touch event.

The stack display determination unit 125 displays data according to the direction of motion of the touch event in the main display area and the stack display area. That is, the stack display determination unit 125 displays main data of the previous order or main data of the next order depending on the direction of motion of the touch event, and displays additional data added to the main data displayed in the main display area in the stack display area. The additional data may be related or associated with the main data. For example, where the main data is a month of the year, the additional data may be a list of 'things-to-do' for a particular day of the month.

Through such a process, the controller 120 can rotate a data display area of the display unit 145 according to the direction of motion of a touch event sensed through the touch screen 140. Further, the controller 120 can control the display unit 145 to change the data in a sequence order according to the direction of motion of the touch event and display a next or previous data of the sequenced data.

The storage unit 130 can store various applications, which can be performed in a terminal, and various sets of data generated during performance of an application. Here, the storage unit 130 stores main data displayed in the display unit 145 and additional data added to main data at data display mode.

A touch screen 140 includes a display unit 145 and a touch sensor 147. Here, the display unit 145 comprises a data display area that displays various sets of data related to the state and operation of a portable terminal. The data display area may encompass the entire area of the display unit 145. Also, the data display area may be divided into specific areas for each set of displayed data. Further, the data display area may be divided into a main display area where main data is displayed and a stack display area where additional data is displayed. Further, in the stack display area, areas where additional data is displayed may be divided into specific areas for each set of additional data. Here, the display unit 145 may display data in a data display mode under the control of the controller 120. At this time, the display unit 145 can arrange data in the form of a list, and main data and additional data can be separately displayed in at least two or more areas. Also, the display unit 145 can rotate the display area according to the direction of motion of a touch event sensed through a touch screen 140 under the control of the controller 120. In this embodiment, as an axis on which the data display area is rotated, the horizontal or vertical center of the data display area can be the basic axis, or a certain location of the edge area of the data display area can be the basic axis. The screen where main data and additional data are being displayed in the display unit 145 will be explained later with reference to FIG. 2.

A touch sensor 147 is installed in the display unit 145, and senses an input event generated by a contact and a release of an object on the surface of the display unit 145. Here, the touch sensor 147 detects the coordinates of an area where an input event is sensed on the surface of the display unit 145, and transmits the detected coordinates to the controller 120. Generally, in order for a touch sensor 147 to sense the coordinates of an area where an input event is sensed, a virtual grid pattern is displayed in the display unit 145, and the coordinates are set at each intersection of a grid pattern. As such, if an input event is sensed on the surface of the display unit 145, the touch sensor 147 can check the intersection corresponding to an area where an input event is sensed, and detect the coordinates corresponding to the confirmed intersections. As such, the controller 120 can check the detected coordinates and determine an area where a touch event is sensed, the direction of motion and speed of the touch event.

Figure 2:
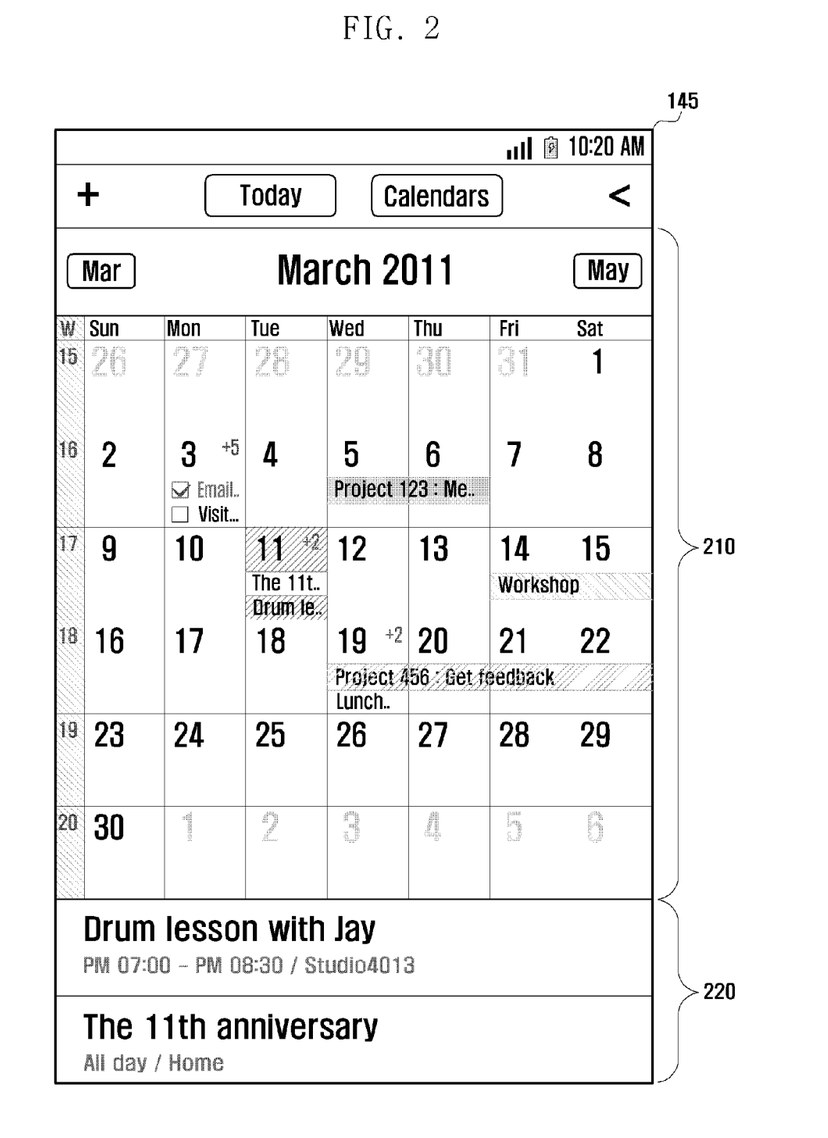
FIG. 2 illustrates a data display screen according to an exemplary embodiment of the present invention.

FIG. 2 illustrates a data display screen according to an exemplary embodiment of the present invention. Here, FIG. 2 illustrates data displayed in the screen of a terminal in a case where the data display mode is at schedule management mode for schedule management. In such a case, the terminal divides the area of the display unit into at least two areas; main data of each mode is displayed in one area, and additional data added to the main data is displayed in the other area.

Referring to FIG. 2, a terminal displays data about a month related with the schedule management mode and data about the things-to-do, which is set by a user in the month in the display unit 145. At this time, the terminal displays data in the form of a month layout, which is the main data, in the main display area 210, and displays preset 'things-to-do' data in the stack display area 220 at schedule management mode.

In the present invention, main data displayed in the main display area 210 means main data at various modes. Further, in the schedule management mode, month data can be main data, and in the image display mode, image data can be main data. Further, in the message display mode, message data, which have been transmitted or received from another source, can be main data. Further, additional data displayed in the stack display area 220 is additional data additionally attached to the main data. For example, at schedule management mode, 'things-to-do' data which is set by a user using dates can be additional data, and at image display mode, detailed information about an image, such as the size, generate date, image type and the place where the image is generated, can also be additional data. Further, in the message display mode, information for the other source to whom a message is transmitted, thumbnail and message summary data, etc. can be additional data.

Main data and additional data can be arranged and displayed vertically, or can be arranged and displayed horizontally. In this example the manner in which main data and additional data are arranged in the display unit 145 can be changed according to the setting of the manufacturing company of each terminal or according to a user's setting Here, it is assumed that the display unit 145 is divided into at least two areas in data display mode; a main data is displayed in the main display area 210 and additional data is displayed in the stack display area 220. However, the present invention is not limited to this example. That is, the present invention can be applied in the case, for example, where data is arranged as a list. In such a case, the entire area where data is displayed may be rotated according to the direction of motion of a touch event, and each specific area may be rotated by dividing the entire area into specific areas where each set of data is displayed. At this time, data of the previous order or data of the next order can be displayed after the rotation of the area where data is displayed, depending on the rotating direction.

Figure 3:
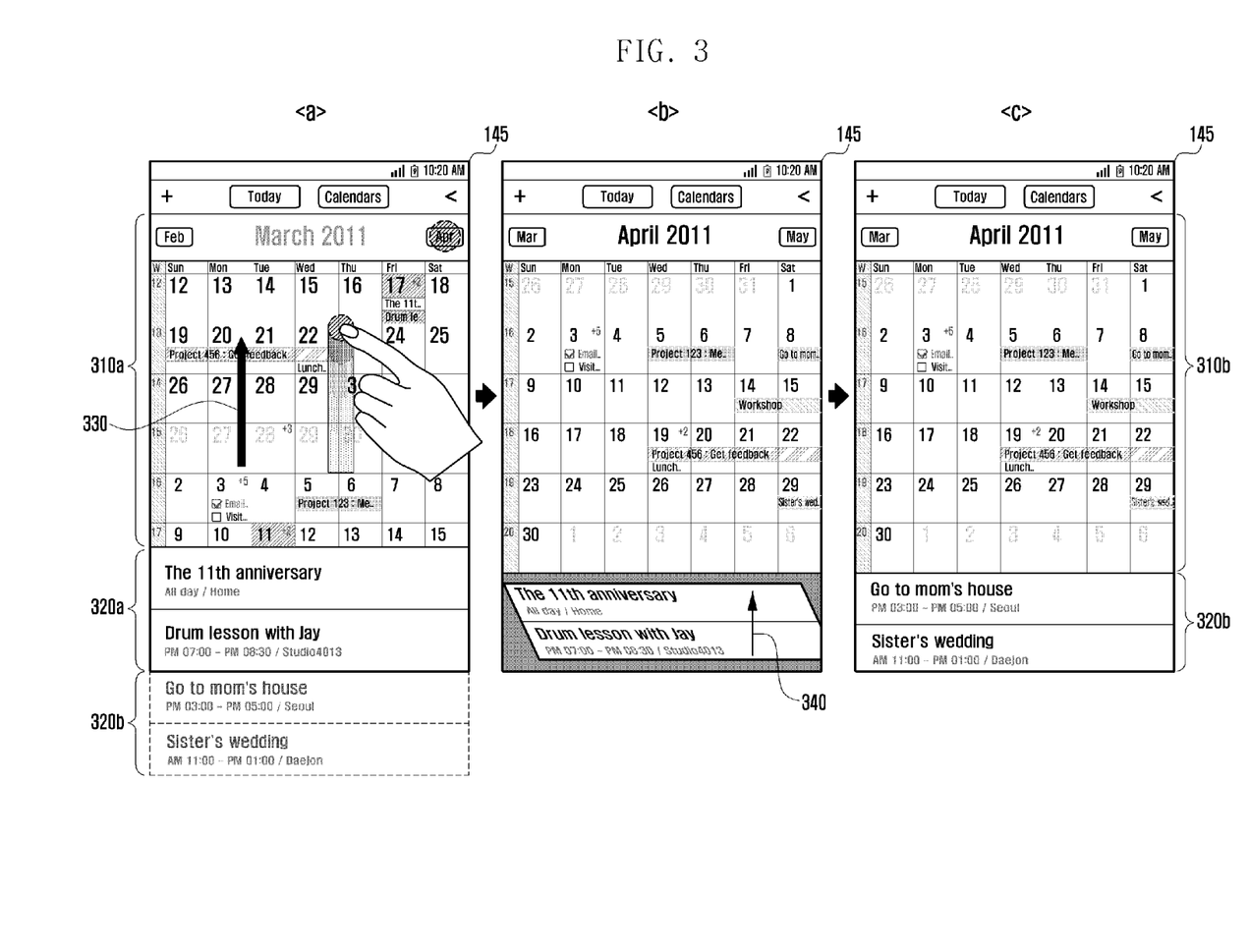
FIG. 3 illustrates a data display screen according to another exemplary embodiment of the present invention.

FIG. 3 illustrates a data display screen according to a first exemplary embodiment of the present invention.

Referring to FIG. 3, a terminal rotates an area where data is displayed according to the direction of motion of a sensed touch event, and displays new data in the display unit 145. Here, it is assumed that data display mode is the schedule management mode.

As illustrated in FIG. 3a, a terminal displays month data in the main display area 310a, and displays things-to-do data, which is set by a user for a specific date of the month in the stack display area 320a. That is, the terminal displays a calendar corresponding to March in the main display area 310a, and displays 'things-to-do' data which is set by a user for $17^{th}$ of March, a specific date of the month, in the stack display area 320a. Reference numeral 320b indicates a stack display area where displays next additional data according to the rotating direction when the stack display area is rotated according to the direction of motion of a touch event.

In order for a user to check data of the next order of data being displayed in the main display area, the main display area is touched by an input tool like a finger, and is then moved. Then, the terminal displays month data corresponding to the next order according to the direction of motion of a touch event in the main display area as illustrated in FIG. 3b. Further, the terminal rotates the stack display area according to the direction of motion 340 of a touch event. That is, referring to FIG. 3a, the touch event moves upward (330). Consequently, the terminal rotates the stack display area in an upward direction as illustrated in FIG. 3b.

Next, the terminal displays a calendar for April which is month data corresponding to the next order according to the direction of motion of a touch event in the main display area 310b as illustrated in FIG. 3c. Further, the terminal displays additional data in the April calendar in the main display area 310b, and displays 'things-to-do' data which is set by a user for the month in the stack display area 320b. Additional data is then displayed in the stack display area 320b where such data may be additional data added to the main data selected from the main data displayed in the main display area 310. Further, additional data displayed in the stack display area 320b may be all data added to all main data displayed in the main display area 310.

Figure 4:
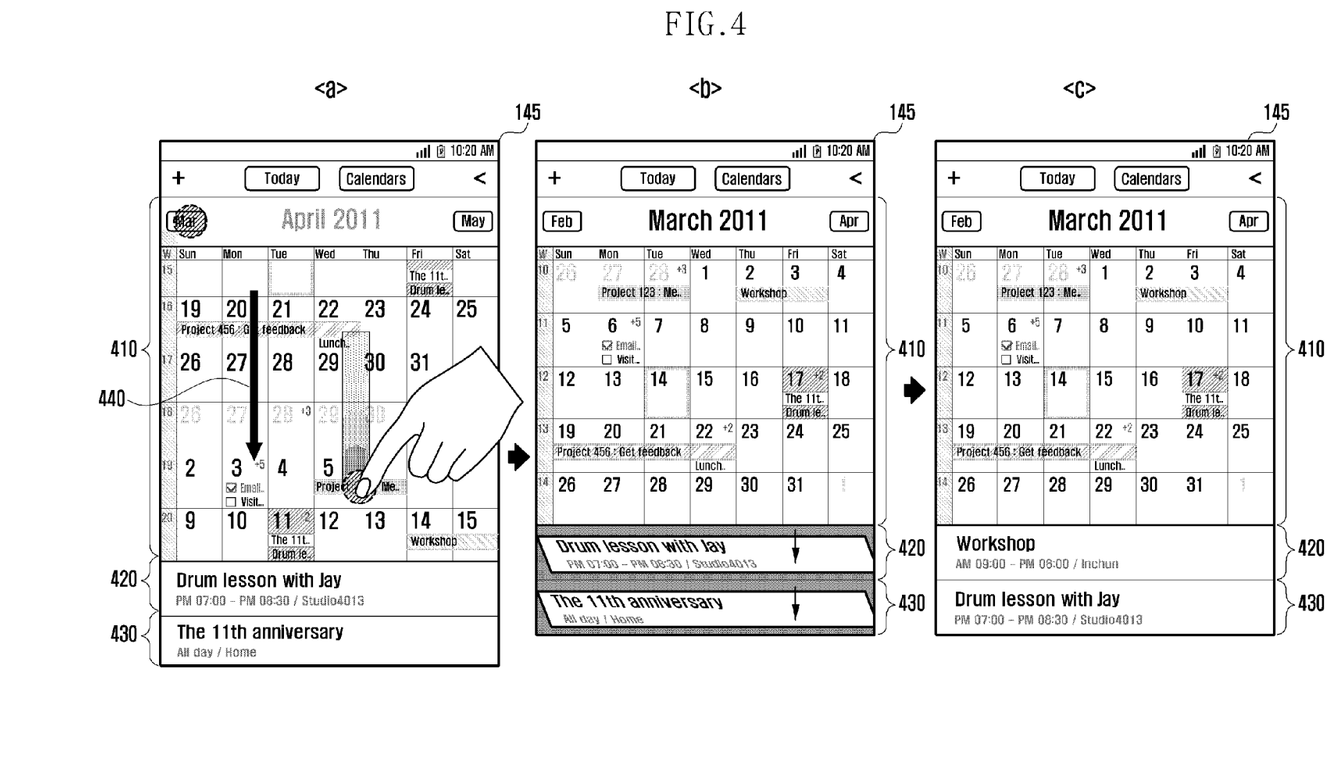
FIG. 4 illustrates a data display screen according to yet another exemplary embodiment of the present invention.

FIG. 4 illustrates a data display screen according to a second exemplary embodiment of the present invention.

Referring to FIG. 4, it is assumed that the data display mode is schedule management mode, and a terminal displays month data in the main display area 410 and displays things-to-do data which is set by a user for a certain date of the month in the stack display areas 420 and 430 as illustrated in FIG. 4a. That is, the terminal displays a calendar corresponding to April in the main display area 410, and displays things-to-do data, which is set by a user for a certain date for the month in the stack display areas 420 and 430.

In order to check data of the previous order displayed in the main display area 410, a user touches and then moves the main display area 410 using an input tool like a finger. The terminal displays month data corresponding to the previous order according to the direction of motion of a touch event in the main display area as illustrated in FIG. 4b. Further, the terminal rotates the stack display area according to the direction of motion of the touch event. That is, referring to FIG. 4a, a touch event moves from the upper end to the lower end of the display unit 145. As a result of the touch event, the terminal rotates the stack display area 420 and 430 (in the same direction as the direction of the touch event) from the upper end to the lower end of the display unit 145 as illustrated in FIG. 4b. Thus, the terminal can distinguish each of the areas where data is arranged as one object, and rotate each object according to the direction of motion of the touch event. Hence, as illustrated in FIG. 4b, the terminal can recognize each of the stack display areas 420 and 430 as a specific area, and rotate each specific area according to the direction of motion.

Next, the terminal displays the March calendar which is month data corresponding to the next order according to the direction of motion of a touch event of the main display area 410 as illustrated in FIG. 4c. Further, the terminal displays things-to-do data, which is set by a user in the March calendar displayed in the main display area 410, in the stack display area 420 and 430. At this time, additional data displayed in the stack display area 420 and 430 can be data added to main data selected among main data displayed in the main display area 410. Further, additional data displayed in the stack display area 420 and 430 may be additional data added to all main data displayed in the main display area 410.

Figure 5:
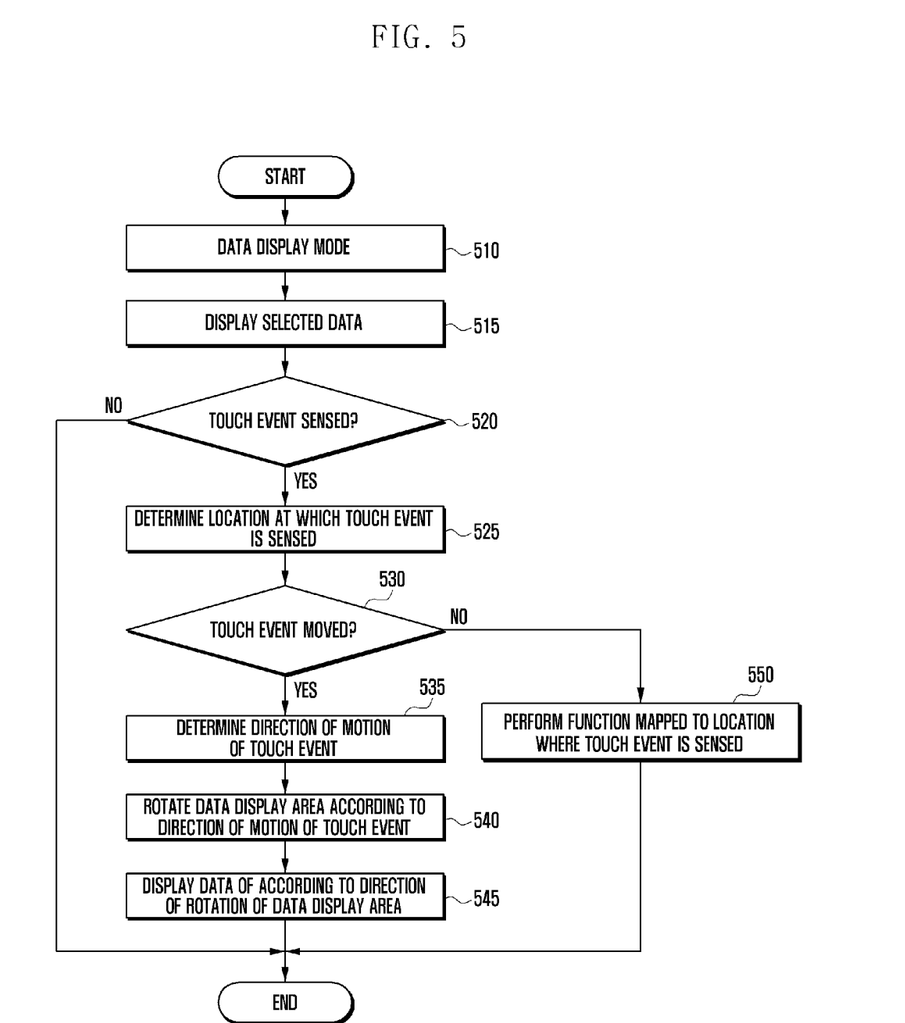
FIG. 5 illustrates a process for displaying data according to a first exemplary embodiment of the present invention.

FIG. 5 illustrates a process for displaying data in a sequence order according to a first exemplary embodiment of the present invention.

Referring to FIG. 5, in step 510 the terminal performs data display mode according to a user's selection. Here, data display mode is a mode that displays data stored in the terminal or received from the outside such as schedule management mode, memo mode, image display mode, message display mode, and e-mail display mode, etc. In step 515, the terminal displays selected data. At this point, data may be displayed as icons or may be listed as a list, or may be displayed in the form of thumbnails.

In step 520, the terminal determines whether a touch event is sensed through the touch screen. In step 525, if the touch event is sensed, the terminal determines a location at which the touch is sensed. In step 530, the terminal determines whether the sensed touch event moves. If the touch event has motion, then the direction of motion of the touch event is detected in step 535.

The terminal rotates the data display area according to the direction of motion of the sensed touch event. For example, if the touch event moves from the upper area to the upper area of the display unit, the terminal rotates the display area from the lower side to the upper side of the display unit in the same direction as the direction of motion of the touch event. Further, if the touch event moves from the left area to the right area of the display unit, the terminal rotates the data display area from the left side to the right side of the display area in the same direction as the direction of motion of the touch event.

Next, in step 545 a terminal displays data according to the direction of rotation of the data display area. For example, if the data display area is rotated from the left side to the right side of the display unit, the terminal newly displays the data of the previous order in the data display area. Further, if the data display area is rotated from the right side to the left side of the display unit, the terminal newly displays the data of the next order in the data display area. Further, if the data display area is rotated from the lower side to the upper side of the display unit, the terminal newly displays data of the next order in the data display area. Further, if the data display area is rotated from the upper side to the lower side of the display unit, the terminal newly displays data of the previous order in the data display area.

Returning to step 530, if, in step 530, a movement of a touch event is not sensed, the method of the present invention moves to step 550 where the terminal performs a function corresponding to a location where the touch event is sensed. That is, if a movement of a touch event is not sensed, the terminal checks a function mapped to the location where the touch event is sensed and performs the corresponding function. Here, the performed function may include all functions, which can be performed in the terminal. For example, the terminal can display a message mapped to the location where a touch event is sensed if the terminal is at message display mode.

Figure 6:
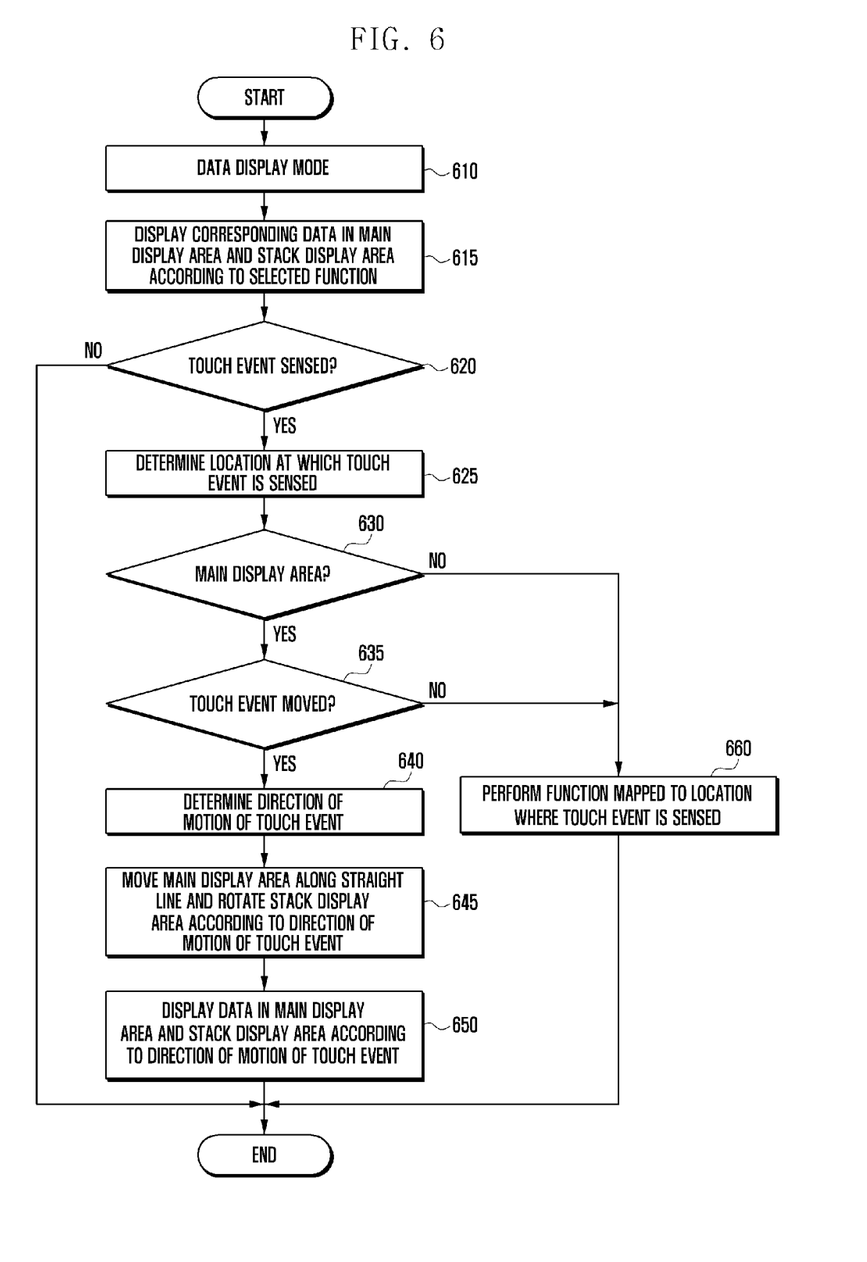
FIG. 6 illustrates a process for displaying data according to a second exemplary embodiment of the present invention.

FIG. 6 illustrates a process for displaying data according to a second exemplary embodiment of the present invention.

Referring to FIG. 6, in step 610, a terminal performs data display mode. Further, in step 615 the terminal displays corresponding data in the main display area and the stack display area according to a selected function. At this time, the terminal displays main data in the main display area, and displays additional data being added to the main data in the stack display area.

Next, in step 620 the terminal determines whether a touch event is sensed. If the touch event is sensed, the terminal determines a location at which the touch event is sensed in step 625. Further, in step 630 the terminal determines whether the location where the touch event is sensed is located in the main display area. The method of determining whether the location where the touch event is sensed is located in the main display area is explained below. A terminal determines the location coordinates of the location where the touch event is sensed, and then the terminal determines whether the location coordinates are within the main display area.

If the location where the touch event is sensed is determined to be in the main display area, then in step 635 the terminal determines whether the touch event moves. If the touch event moves, then in step 640 the terminal determines the direction of motion of the touch event. In step 645 the terminal moves the main display area along the straight line according to the direction of motion of the touch event. The terminal rotates the stack display area according to the direction of motion of the touch event. For example, if a touch event moves from the lower area to the upper area of the display unit, the terminal moves the main display area from the lower side to the upper side of the display unit in the same direction as the direction of motion of the touch event. Also, the terminal rotates the stack display area from the lower side to the upper side of the display unit in the same direction as the direction of motion of the touch event. If a touch event moves from the left side to the right side of the display unit, the terminal moves the main display area from the left side to the right side of the display unit in the same direction as the direction of motion of the touch event. Further, the terminal rotates the stack display area from the left side to the right side of the display unit in the same direction as the direction of motion of the touch event.

In step 650, the terminal displays data according to the direction of motion of the touch event in the main display area and the stack display area. That is, the terminal displays main data of the previous order or main data of the next order in the main display area according to the direction of motion of the touch event, and displays additional data, which is added to the main data displayed in the main display area, in the stack display area.

In contrast, returning to step 635, if the location where the touch event is sensed is not located in the main display area or movement of the touch event is not sensed, the terminal, in step 660, performs a function according to the location where a touch event is sensed. For example, if movement of a touch event is not sensed, the terminal checks a function mapped to the location where the touch event is sensed. Further, the terminal performs a checked function. Here, the performed function can include all functions that can be performed in the terminal. For example, in message display mode, the terminal can display a message mapped to the area where a touch event is sensed.

In the present invention, it has been explained that the display unit is divided into a main display area where main data is displayed and a stack display area where additional data is displayed. The stack display area is rotated according to the direction of motion of a touch event sensed in the main display area, but the present invention is not limited to this example. That is, the present invention is applied even in cases where the display unit is not divided into the main display area and the stack display area. The terminal can divide a display area where data is listed into specific areas, and the divided specific areas can be rotated according to the direction of motion of the touch event. Also, the terminal can move data according to the direction of motion of touch event at each rotated area.

Further, the terminal can control the speed at which the area where data is displayed is rotated according to the moving speed of the sensed touch event. That is, if the moving speed of the touch event is high, the terminal can rotate quickly the area where data is displayed. Further, if the moving speed of the touch event is low, the terminal can slowly rotate the area where data is displayed. It was explained above that the touch event can move from the upper end to the lower end, from the lower end to the upper end, from the left side to the right side, and from the right side to the left side of the display unit, but the present invention is not limited to these examples. That is, the touch event may move in a diagonal direction, and in such a case, the terminal can rotate the area where data is displayed in a diagonal direction.

According to the present invention, data can be visually displayed according to a touch event sensed in a terminal having a touch screen. By visually displaying data, a user can recognize changed data easily. Further, as data is changed according to the direction of motion of a touch event, a user can easily recognize the order of the data.

The above-described methods according to the present invention can be implemented in hardware, firmware or as software or computer code that can be stored in a recording medium such as a CD ROM, an RAM, a floppy disk, a hard disk, or a magneto-optical disk or computer code downloaded over a network originally stored on a remote recording medium or a non-transitory machine readable medium and to be stored on a local recording medium, so that the methods described herein can be rendered in such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

Although exemplary embodiments of the present invention have been described in detail hereinabove, it should be clearly understood that many variations and modifications of the basic inventive concepts herein taught which may be conceived to those skilled in the present art will still fall within the spirit and scope of the present invention, as defined in the appended claims.

What is claimed is:

1. A method for displaying data in a terminal having a touch screen, the method comprising:
    displaying data in a display area of the touch screen, the display area comprising a main display area and a stack display area;
    in accordance with a motion direction of a touch event sensed on the main display area, rotating the stack display area and changing data displayed in the main display area; and
    changing data in the stack display area to data corresponding to the changed data in the main display area.

2. The method of claim 1, wherein the rotating the stack display area comprises:
    detecting whether the touch event is sensed in the main display area;
    detecting whether the sensed touch event includes a movement; and
    detecting, when the sensed touch event is the movement, the direction of the movement.

3. The method of claim 1, wherein the displayed data comprises data in a sequence order.

4. The method of claim 3, wherein a next or previous data of the sequenced data is displayed in the display area according to the direction of motion of the sensed touched event.

5. The method of claim 2, further comprising:
    detecting whether the touch event is sensed in the main display area or in the stack display area; and
    detecting, when the touch event is sensed in the main display area, whether the touch event is the movement.

6. The method of claim 5, wherein detecting whether the touch event is sensed in the main display area or in the stack display area is based on determining location coordinates of the location at which the touch event is sensed.

7. The method of claim 1, wherein the stack display area displays additional data associated with main data displayed on the main display area.

8. The method of claim 1, wherein the stack display area is divided into specific display areas and each specific display area is rotated in accordance with the direction of motion of the sensed touch event.

9. The method of claim 1, wherein a data display mode is one of a schedule management mode, memo mode, image display mode, message display mode, and e-mail display mode.

10. The method of claim 9, wherein the data display mode is the schedule management mode and wherein month data is displayed in the main display area and 'things-to-do' data is displayed in the stack display area, the 'thing-to-do' data being added to the month data according to a user's setting.

11. The method of claim 10, wherein the stack display area comprises at least one of specific display areas and at least one of which is rotated according to the direction of motion of the touch event sensed in the main display area.

12. The method of claim 10, wherein the 'things-to-do' data is displayed in a sequence in accordance with a rotation direction of the stack display area.

13. A terminal for displaying data, the terminal comprising:
    a touch screen comprising a display unit to display data in a data display area, the display area comprising a main display area and a stack display area;
    a touch sensor to sense a touch event;
    a controller to:
        detect when the touch event is sensed through the touch screen,
        detect whether the touch event is a movement;
        if the touch event is the movement and is detected in the main display area, rotate the stack display area in a direction of the movement and change data displayed in the main display area in accordance with the direction of the movement; and
        change data displayed in the slack display area to data corresponding to the changed data in the main display area in accordance with a rotation of the stack display area.

14. The terminal of claim 13, wherein the controller comprises a stack display determination unit to check the direction of movement of the touch event and to rotate at least one area in which data is displayed in accordance with the direction of movement of the sensed touch event.

15. The terminal of claim 13, wherein the controller to identify whether the area in which the touch event is sensed is located in the main display area where main data is displayed, and, when the touch event is sensed in the main display area, detect whether the touch event is the movement.

16. The terminal of claim 15, wherein the controller to control the display unit to rotate the stack display area in accordance with the direction of movement of the touch event.

17. The terminal of claim 16, wherein the controller to control the display unit to rotate at least one specific area of the stack display area, in accordance with the direction of movement of the touch event.

18. The terminal of claim 13, wherein a data display mode is one of a schedule management mode, memo mode, image display mode, message display mode and e-mail display mode.

* * * * *

UNITED STATES PATENT AND TRADEMARK OFFICE
CERTIFICATE OF CORRECTION

PATENT NO. : 9,158,451 B2
APPLICATION NO. : 13/666091
DATED : October 13, 2015
INVENTOR(S) : Jaemyoung Lee

Page 1 of 1

It is certified that error appears in the above-identified patent and that said Letters Patent is hereby corrected as shown below:

In the Claims

Column 12, Claim 13, Line 28 should read as follows:
--…in the stack display…--

Signed and Sealed this
Twentieth Day of August, 2019

Andrei Iancu
*Director of the United States Patent and Trademark Office*